Oct. 5, 1937.       G. ÖRSTRÖM       2,094,927
DEVICE FOR CLOSING BAG ENDS
Filed Aug. 29, 1936     9 Sheets-Sheet 1
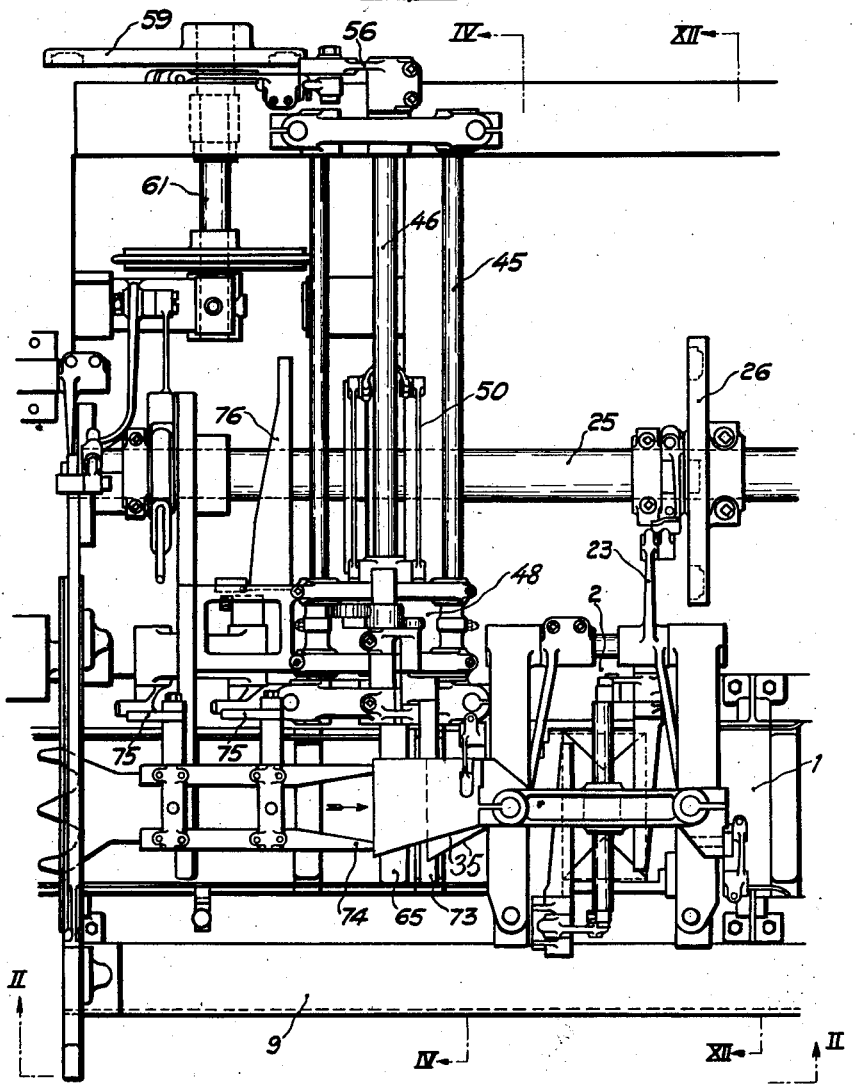

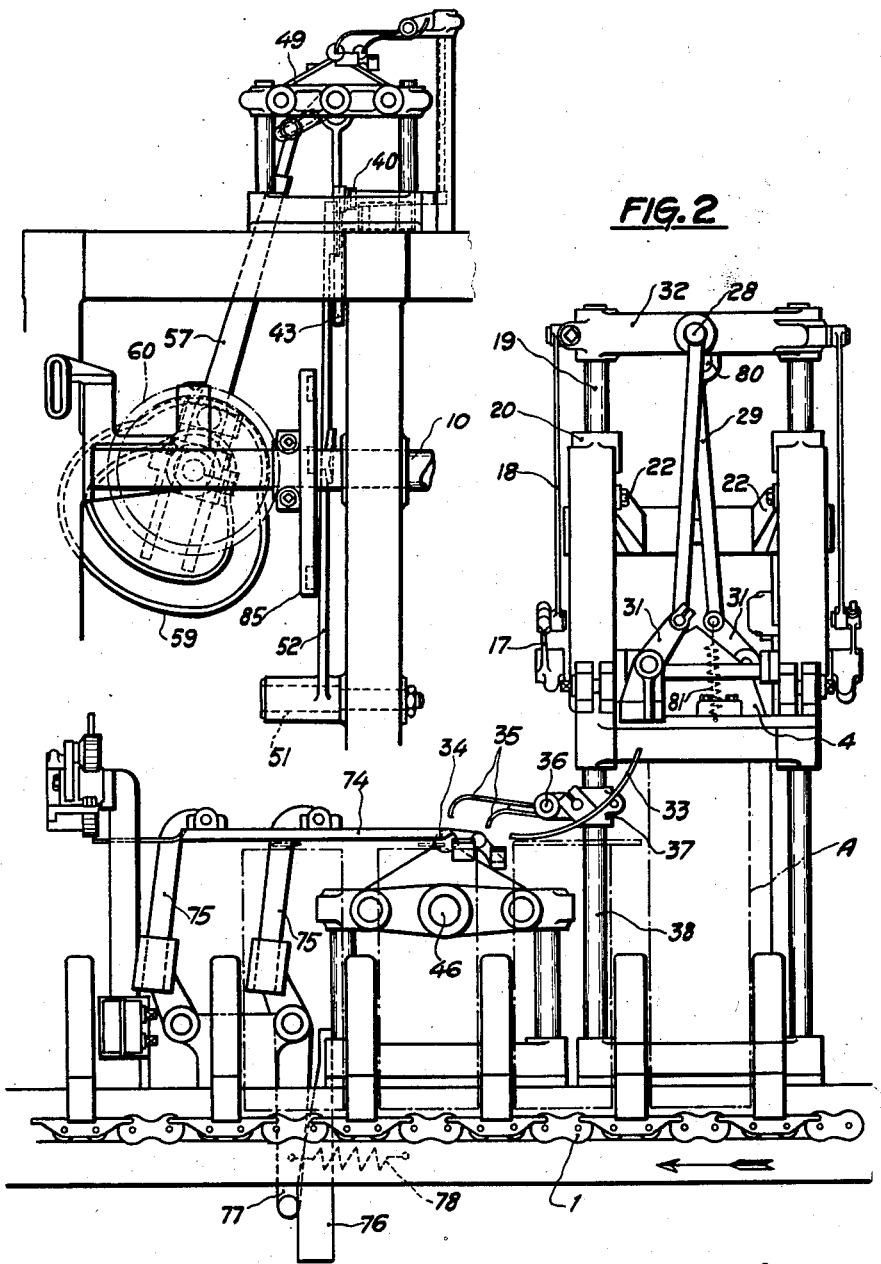

Oct. 5, 1937.  G. ÖRSTRÖM  2,094,927
DEVICE FOR CLOSING BAG ENDS
Filed Aug. 29, 1936  9 Sheets-Sheet 3

Inventor
Gustaf Örström
By Sommers & Young
Attys.

Oct. 5, 1937.  G. ÖRSTRÖM  2,094,927
DEVICE FOR CLOSING BAG ENDS
Filed Aug. 29, 1936   9 Sheets-Sheet 4

Inventor
Gustaf Örström
By Sommers & Young
Attys

Oct. 5, 1937.  G. ÖRSTRÖM  2,094,927
DEVICE FOR CLOSING BAG ENDS
Filed Aug. 29, 1936   9 Sheets-Sheet 5

Inventor
Gustaf Örström
By Sommers & Young
Attys

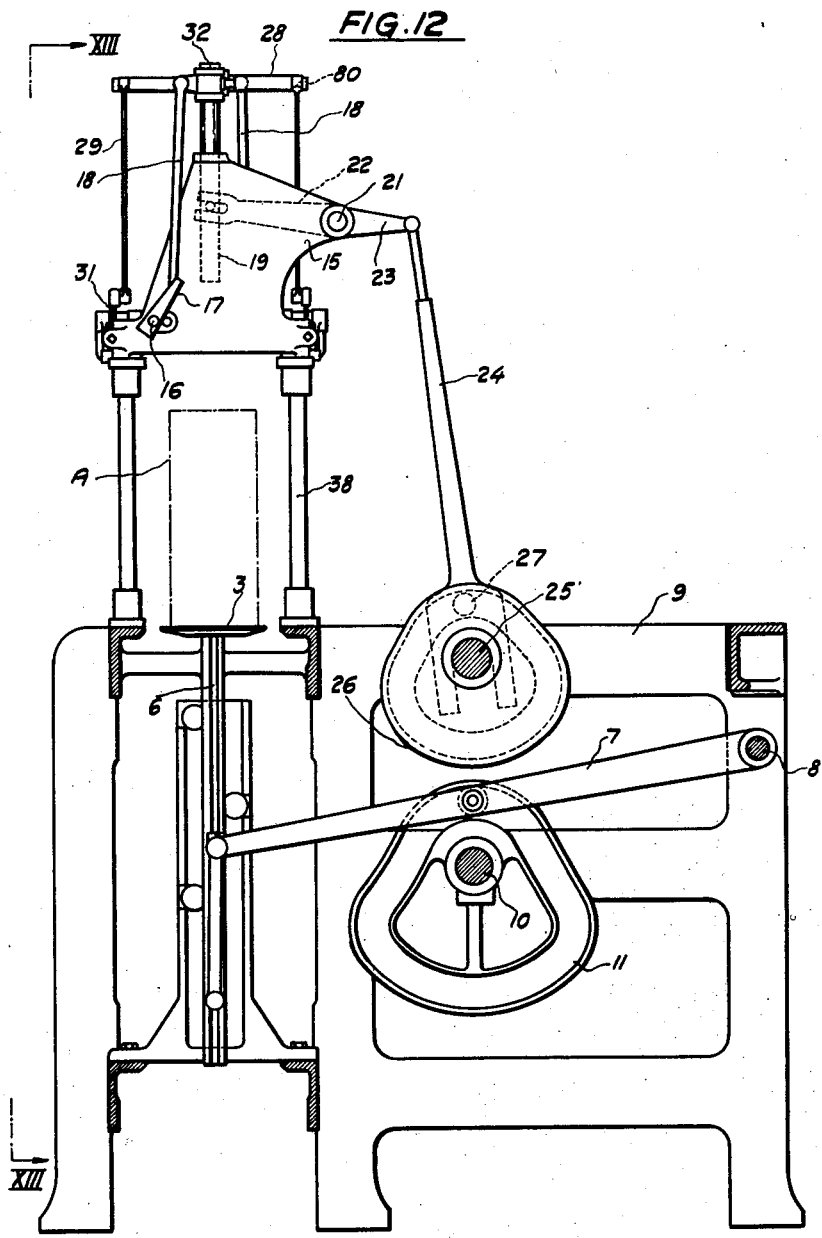

Oct. 5, 1937.  G. ÖRSTRÖM  2,094,927
DEVICE FOR CLOSING BAG ENDS
Filed Aug. 29, 1936  9 Sheets-Sheet 8
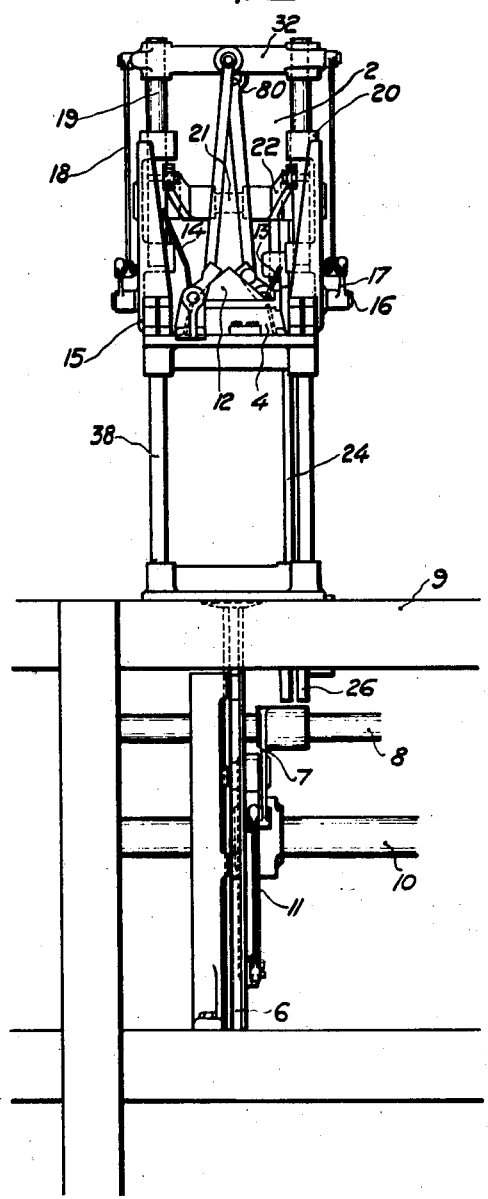
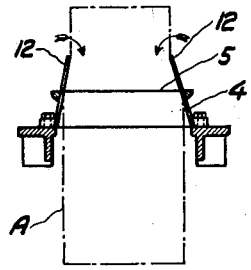
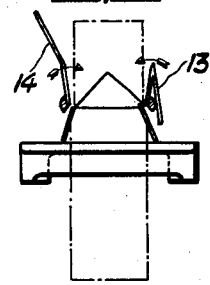
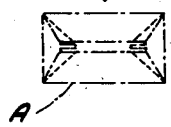
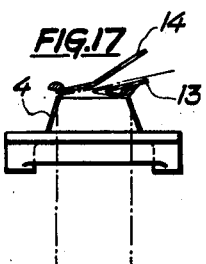

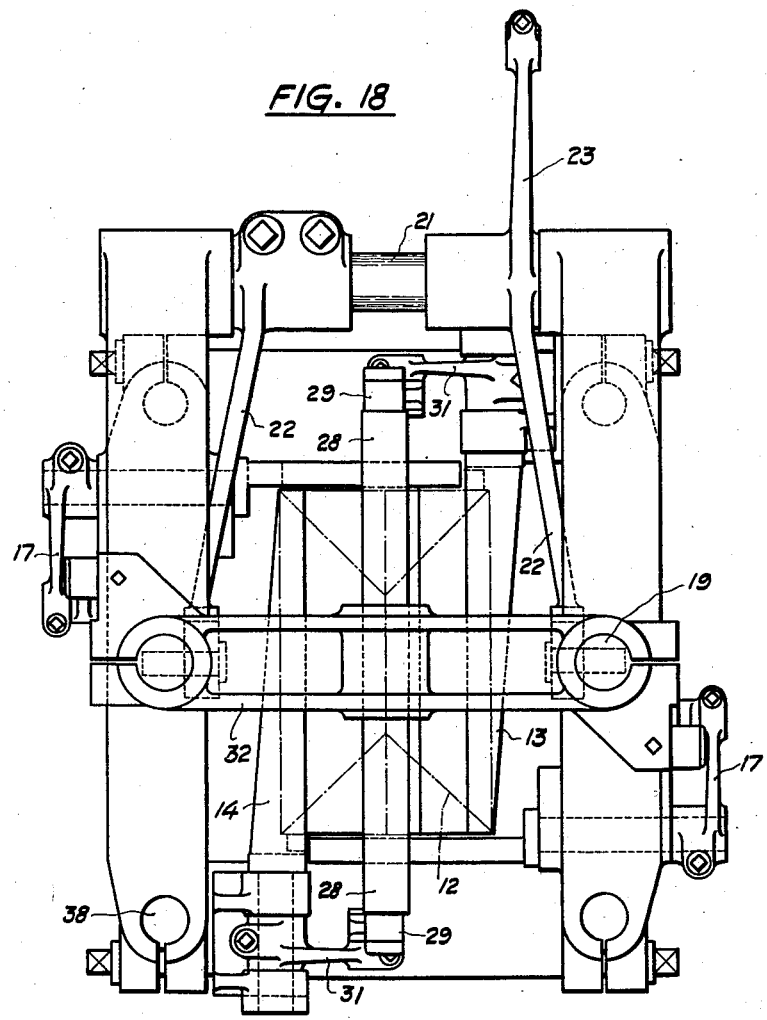

Patented Oct. 5, 1937

2,094,927

UNITED STATES PATENT OFFICE 2,094,927

DEVICE FOR CLOSING BAG ENDS

Gustaf Örström, Alsten, Sweden, assignor to Aktiebolaget Gerh. Arehns Mekaniska Verkstad, Stockholm, Sweden Application August 29, 1936, Serial No. 98,588
In Sweden August 30, 1935

18 Claims. (Cl. 93—6)

This invention relates to a device for closing bag ends and it is an object of the invention to provide improved means for closing bag ends by producing a transverse coil which is very smooth and regularly shaped.

Another object of the invention is to provide compact and inexpensive means adapted to close bag ends by coiling them.

Further objects of my invention will appear from the following description when read in connection with the accompanying drawings showing an illustrative embodiment of the invention and wherein:—

Fig. 1 is a plan view of the device according to the invention;

Fig. 2 is an elevation taken in the direction II—II of Fig. 1;

Fig. 3 is a front view of a coiling mechanism together with driving device;

Fig. 12 is a section on the line XII—XII in Fig. 1;

Fig. 13 is a view, viewed in the direction XIII—XIII in Fig. 12;

Figs. 14 and 15 are sections taken at right angles to one another of a detail of the device according to Fig. 13;

Fig. 16 is a diagrammatic plan view of the detail shown in Figs. 14 and 15;

Fig. 17 is a view corresponding to Fig. 15 but showing the operating members in another position; and Fig. 18 is a plan view on a larger scale of the device shown in Fig. 13.

Figure 4:
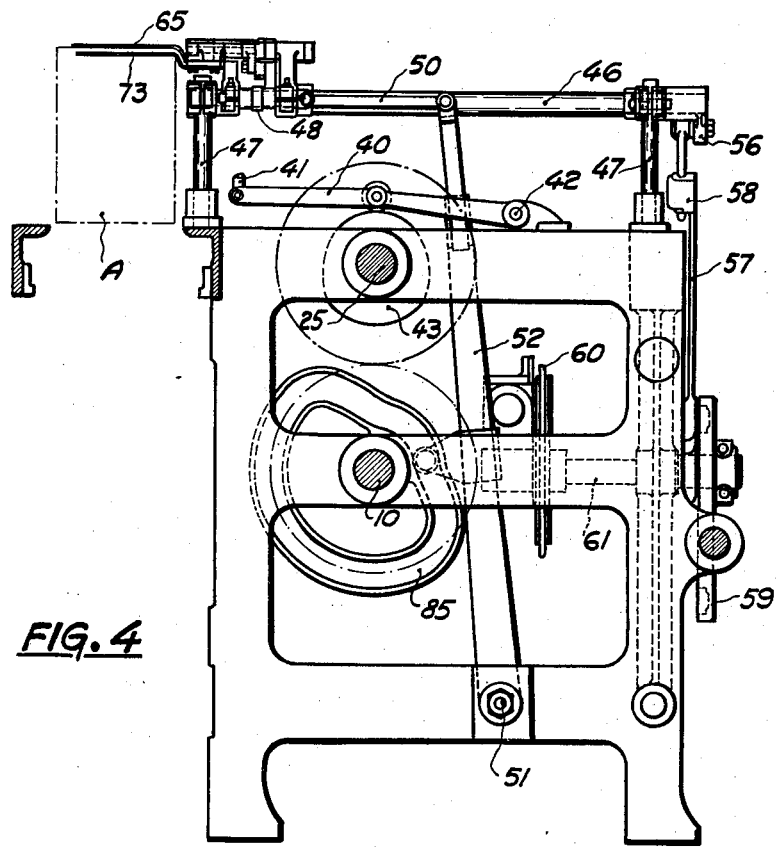
Fig. 4 is a section on the line IV—IV in Fig. 1 with some details removed.

Referring to the drawings, the open, filled bags A are moved by the conveyor 1 stepwise in the direction of the arrow (Fig. 2) into a position below a folding device 2 (Fig. 1). There the bag is raised by means of a lifting piston 3 (Fig. 12) through a funnel-shaped frame 4 (Fig. 2) to the position shown in Fig. 14, so that, if the bag is provided with folding creases the lowermost crease extending around the bag is at a level with the upper edge 5 of the frame.

The lifting piston 3 is supported by a rod 6 which is pivotally connected to an arm 7 pivotally journalled on a pin 8 in the machine frame 9. On a driving shaft 10 journalled in the machine frame is fixed a cam disc 11 which imparts to the arm 7 and thereby to the lifting piston 3 periodical movements up and down.

At the upper edge of the frame 4 are pivotally journalled a pair of oppositely disposed tucking flaps 12, a rear bag collapsing flap 13 and a front one 14. The flaps 12 are each secured to a pin 16, rotatably journalled in the frame 15. The frame 15 is secured to columns 38. To each pin 16 is secured an arm 17 which is pivotally connected to a link 18. Both the links 18 are pivoted to a yoke 32, which is secured to two spindles 19, which are movable up and down in guides 20 on the frame 15. In the frame 15 is turnably journalled a shaft 21, to which are secured two arms 22, which by means of forks are pivotally connected each to one of the spindles 19. One of the arms 22 is developed as a lever, the other arm 23 of which is pivoted to one end of a link rod 24, the other end of which embraces a shaft 25, rotatably journalled in the machine frame. To the shaft 25 is secured a cam disc 26, arranged at rotation to actuate the roller 27, journalled on the rod 24, and thereby impart to the rod periodical up and down movements. The yoke 32 is provided with laterally projecting arms 28, to which are pivotally connected links 29. Each link 29 is pivoted to an arm 31. The arms 31 are each connected with one of the collapsing flaps 13 and 14. The upper end of the link, connected to the flap 13 is provided with an oblong slot 80, which embraces the arm 28, and one of the arms 31, that is connected to said flap, is urged downwardly by tension spring 81, so that the corresponding link 29 is pulled down so far as the arm 28 permits.

Figure 5:
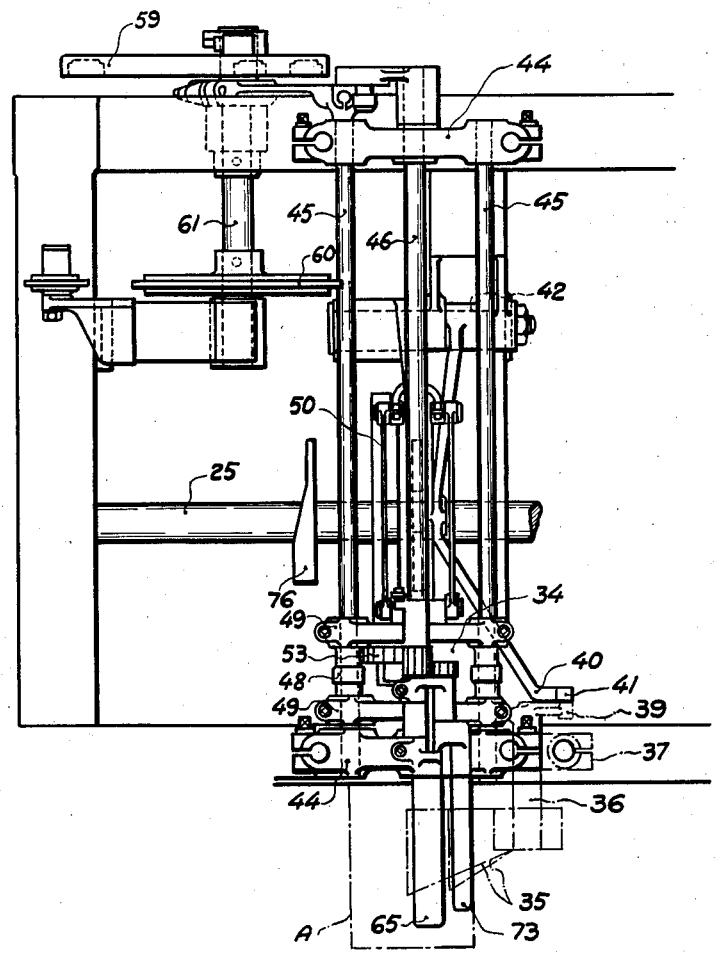
Fig. 5 is a plan view of the part of the device shown in Fig. 4.
Figure 6A:
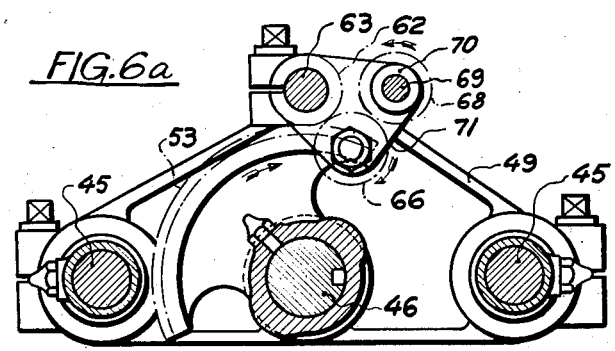
Fig. 6a is a sectional view taken on the line VIa—VIa of Fig. 8.

When the bag A has been moved up to the position shown in Fig. 14 the cam disc 26 moves the rod 24 upwards. Then the arms 22 move the spindles 19 and the yoke 32 downwards, so that the tucking flaps 12 are first folded inwardly down into the position shown in dash and dotted lines in Fig. 18, whereby the bag end obtains the shape shown in Fig. 16. Thereafter, the rear collapsing flap 13 is moved downwardly to the position shown in Fig. 17, and thereupon the front flap 14 is moved down upon the flap 13, so that the bag end thus flattened has been laid down in a direction opposite to the direction of movement of the conveyor and the succeeding coiling direction, which imparts to the bag end a suitable starting position for the subsequent coiling, whereby vertical coiling movements are avoided. During the last part of the downward movement of the yoke 32 the arm 28 moves idly in the link slot 80, whereby the corresponding flap is held down by the spring 81. Now the lifting piston 3 is lowered with the filled bag, so that this rests anew upon the conveyor 1. The conveyor advances one step, whereby the rearwardly folded bag end is folded down under a bent guide plate 33 to the position shown in dash and dotted lines in Fig. 2, until the bag is in position in front of the coiling mechanism 34. There the bag end is retained in a downfolded position by means of a holding device comprising two downwardly bent plates 35. The plates 35 are secured to one end of a shaft 36, which is turnably journalled in a vertically adjustable bracket 37, secured to one of the columns 38. To the other end of the shaft 36 is secured an arm 39 pivotally connected to one end of a lever 40 by means of a link 41 (Figs. 4 and 5). The other end of the lever 40 is turnably journalled on a pin 42 in the machine frame, and it is given up and down movements by a cam disc 43 secured to the shaft 25, so that the plates 35 are swung between the end positions indicated in Figs. 2 and 9.

Figure 6:
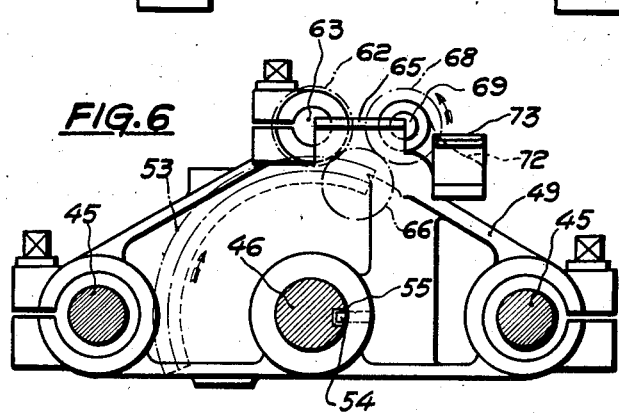
Fig. 6 is a front view partly in section of the coiling mechanism on a larger scale.
Figure 9:
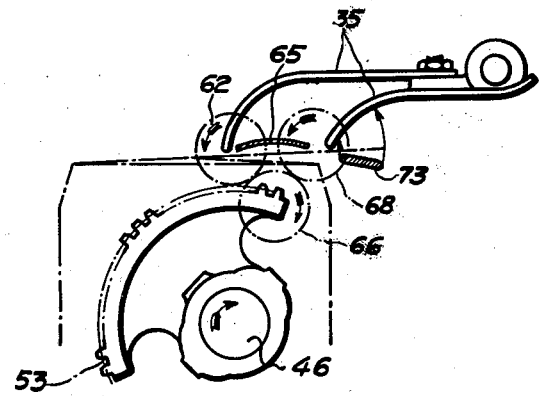
Figs. 9–11 illustrate different steps of the coiling procedure.

The coiling mechanism is supported by two brackets 44, connected to each other by means of two horizontal rods 45. A shaft 46 is turnably journalled in the brackets 44 which are vertically secured to standards 47 in such a manner as to be adjustable in a vertical direction. A yoke 48 is displaceably mounted on the rods 45 and the shaft 46. To its rear end are pivotally connected two link rods 50, which, moreover, are pivoted to one end of an arm 52, turnably journalled at 51 in the frame. The arm 52 is actuated by a cam disc 85 which is secured to the driving shaft 10 and imparts periodical reciprocating movements to the arm and thereby to the yoke 48. Between the beams 49 of the yoke 48 and mounted on the shaft 46 is a toothed segment 53 (Fig. 6) which can follow the reciprocating movements of the yoke on the shaft 46 but not turn relative to the same. It is provided with a transverse pin 54 which projects into a longitudinal groove 55 formed in the shaft 46. The toothed segment is normally held by the shaft 46 in the angular position shown in Figs. 6 and 9. Periodical reciprocating swinging movements can be imparted to the shaft 46 by means of an arm 56 (Fig. 4) secured to the rear end of said shaft, which arm is pivoted to a link rod 57, the length of which can be adjusted at 58. To the link rod 57 is imparted periodical movements up and down by a cam disc 59, rotated by a transmission 60 which is connected to the driving device of the machine and drives the cam disc shaft 61. The toothed segment 53 meshes with a pinion 62 which is loosely mounted on the shaft 63 which, in turn, is rotatably journalled in the yoke 48. To the front end of the shaft 63 is secured a laterally projecting arm 64, which supports a relatively thin, finger-shaped, slightly fluteshaped (Fig. 9) leg 65, which is normally positioned on a level with the shaft 63 (Figs. 6 and 9). The pinion 62 meshes with another pinion 66, which is loosely journalled on a pin 67, which is inserted into an arm 71 secured to the shaft 63. The pinion 66 meshes with a gear wheel 68, which is formed with a shaft 69. Said shaft is loosely journalled in a sleeve 70, which projects from the arm 71, parallel with the shaft 63. To the front end of the shaft 69 is secured an arm 72, to which is secured a relatively thin, finger-shaped leg 73, which extends parallel with the leg 65 and is normally positioned approximately on a level with or somewhat lower than the leg 65 (Figs. 6 and 9), and the axis of the shaft 69 coincides approximately with the rear edge of the leg 65. The axis of the shaft 63 coincides substantially with the front edge of the leg 65.

Figure 7:
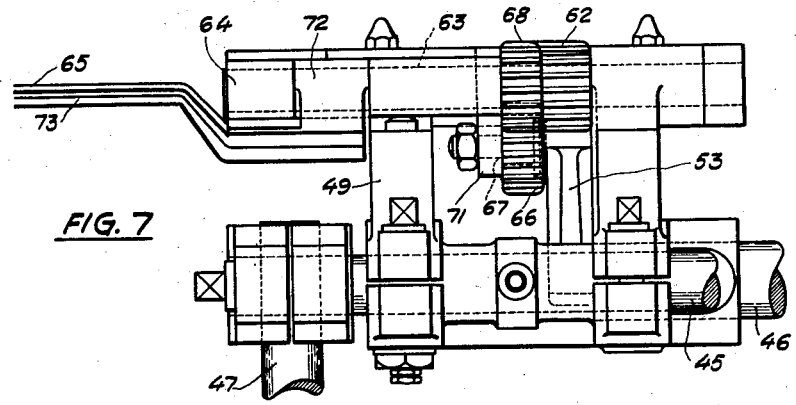
Figs. 7 and 8 are a side view and a plan view, respectively, of the coiling mechanism on a larger scale.
Figure 8:
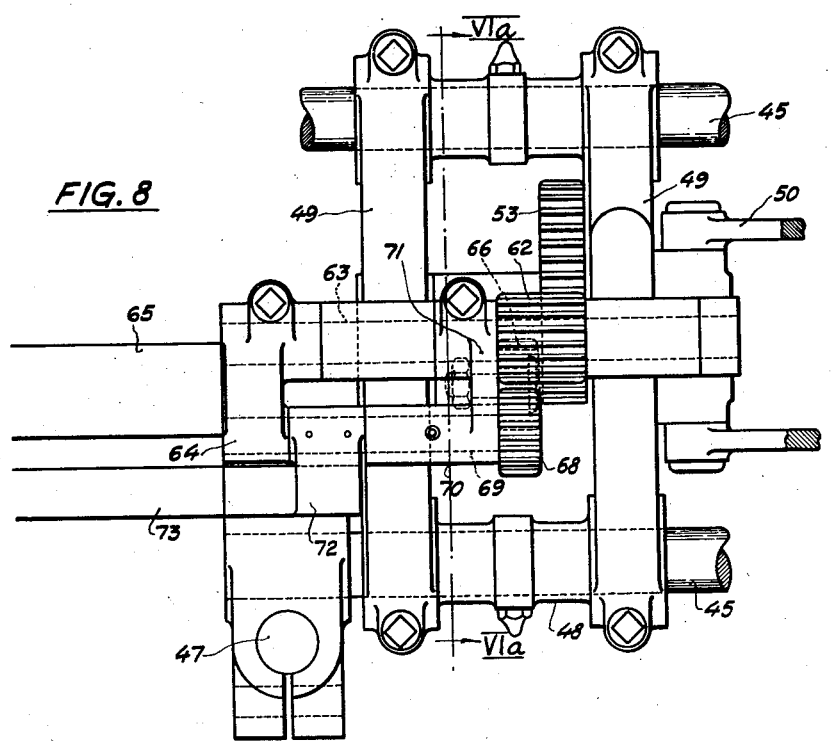
Figure 10:
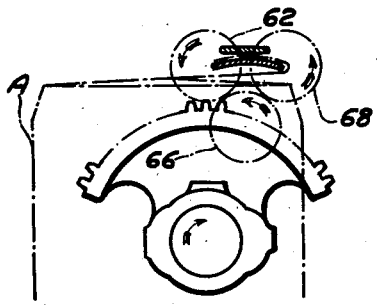
Figure 11:
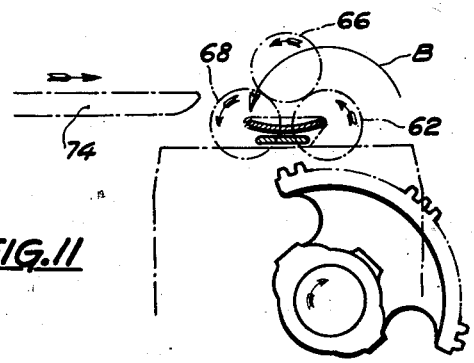

The coiling mechanism operates in the following manner:

The yoke 48 with the legs 65 and 73, in relative positions shown in Figs. 7–9, is advanced until the legs straddle the downfolded, flattened bag end (Fig. 9), whereby the leg 65 is inserted between the plates 35. As soon as the legs 65 and 73 have begun to straddle the bag end, and in any case before the beginning of the coiling, the holder plates 35 are swung up into the position shown in Fig. 2. Thereafter the swinging movement of the shaft 46 in the direction of the arrow (Figs. 9–11) commences. The toothed segment 53 thereby imparts to the pinions 62 and 66 and the gear wheel 68 rotation in the direction of the arrows (Fig. 9), whereby the leg 73 is swung in laterally against the leg 65 covering it and bending the outermost bag end (Figs. 9 and 10). Now the leg 65 forms a stop for the leg 73, and thereby the continued rotation of the gear wheel 68 is prevented. Therefore, the axis of rotation is transferred from the shaft 69 to the shaft 63, and the fork, consisting of the legs 65 and 73, now closed, will turn about the shaft 63 (in the direction B of Fig. 11), i. e. in the same direction as the arm 72 at its preceding turning movement, and thereby the bag end is coiled in the manner illustrated in Fig. 11. Thus the axis of rotation is suddenly transferred from the rear edge of the leg 63 to its front edge, wherefore the bag end is not subjected to inappropriate tension action during the coiling, and the coil folding takes place along predetermined creases.

If the gearing for the coiling movement is supplemented by more gear wheels, said coiling movement can continue in the same direction for a still further number of semi-revolutions, whereby the fork is alternately swung about both its longitudinal edges, which are thus stepwise laterally displaced. Alternatively, after the folding according to Fig. 10 has been effected, the coiling movement may continue in a reversed direction, whereby the first part of the coil will be of zigzag form. In the embodiment shown it is supposed, however, that the coiling is finished, when the legs have assumed the position shown in Fig. 11.

Now a pair of depressing bars 74 are moved in the direction of the arrow (Fig. 1) into a position closely above the coiled bag fold. Thereafter the yoke 48 with the coiling fork is retracted, and the fork is opened by swinging back the toothed segment 53 when the legs are turned back into their initial positions.

The bars 74 are supported by two arms 75, which are turnably journalled in the frame, and impart to them parallel movements. The swinging movements of the arms 75 are effected by a cam disc 76 which is secured to the shaft 25, and against which an arm 77, rigidly secured to one of the arms 75, is held by a tension spring 78. When the closed bag is moved further, e. g. to a mechanism for applying a sealing strip to the bag coil, the bars 74 follow the latter and hold down the bag fold, until the bag has been sealed.

What I claim is:

1. In a device for closing bags by coiling a flattened end thereof, a pair of blade-shaped legs, means for moving one of said legs against the other to form therewith a closed, substantially blade-shaped fork adapted to straddle a bag end, and means for moving the closed fork laterally by turning the same substantially through one semi-revolution about a longitudinal edge of one of said legs, substantially without lateral displacement of said edge.

2. In a device for closing bags by coiling a flattened end thereof, a pair of blade-shaped legs, means for moving one of said legs laterally over a longitudinal edge of the other leg to cover said other leg and form a closed, substantially blade-shaped fork adapted to straddle a bag end, and means for moving the closed fork laterally by turning same substantially through one semi-revolution about the other longitudinal edge of said other leg, substantially without lateral displacement of said other edge.

3. In a device for closing bags by coiling a flattened end thereof, a pair of blade-shaped legs, means for moving one of said legs laterally over a longitudinal edge of the other leg to cover said other leg and form a closed, substantially blade-shaped fork adapted to straddle a bag end, and means for moving the closed fork in the same lateral direction as the first leg by turning said fork substantially through one semi-revolution about the other longitudinal edge of said other leg, substantially without lateral displacement of said other edge.

4. In a device for closing bags by coiling a flattened end thereof, a bag conveyor, a pair of blade-shaped legs, means for moving one of said legs against the other to form with the other leg a closed, substantially blade-shaped fork adapted to straddle said bag end, and means for moving said closed fork laterally in the feeding direction of said conveyor by turning said fork substantially through one semi-revolution about a longitudinal edge of one of said legs substantially without lateral displacement of said edge.

5. In a device for closing bags by coiling a flattened end thereof, a pair of parallel blade-shaped legs, means for moving one of said legs toward the other to form with the other leg a closed, substantially blade-shaped fork adapted to straddle said bag end, and means for moving said closed fork laterally by turning same substantially through one semi-revolution about a longitudinal edge of one of said legs substantially without lateral displacement of said edge, one of said legs extending along the other leg and being turnable about an axis which extends substantially in the same line as a longitudinal edge of said other leg.

6. In a device for closing bags by coiling a flattened end thereof, two parallel, rotatable shafts, a pair of parallel, blade-shaped legs, each forming an eccentric longitudinal extension of one of said shafts, means for rotating one of said shafts to turn the leg connected thereto to cover the other leg, and form together with said other leg a substantially blade-shaped fork adapted to straddle the bag end, and means for rotating the other shaft to turn said closed fork substantially through one semi-revolution, the axes of said shafts extending substantially in the same line as the opposite longitudinal edges of said other leg.

7. In a device for closing bags by coiling the flattened end thereof, two parallel, rotatable shafts, an arm projecting laterally from each of said shafts, a blade-shaped leg secured to each of said arms so that said legs form eccentric, longitudinal extensions of said shafts, means for rotating one of said shafts to turn the leg connected thereto laterally to cover the other leg and form together with said other leg a blade-shaped fork adapted to straddle the bag end, and means for rotating the other shaft to turn said closed fork substantially through one semi-revolution, the axes of said shafts extending substantially in the same line as opposite longitudinal edges of said other leg.

8. In a device for closing bags by coiling the flattened end thereof, two parallel shafts, a pair of blade-shaped legs, each forming an eccentric, longitudinal extension of one of said shafts, and a gearing operatively connecting said shafts for rotating one of said shafts to turn the leg connected thereto laterally to cover said other leg and form a closed, blade-shaped fork adapted to straddle the bag end, and for rotating the other shaft to turn the closed fork substantially through one semi-revolution, the axes of said shafts extending substantially in the same line as opposite longitudinal edges of said other leg.

9. In a device for closing bags by coiling the flattened end thereof, two parallel shafts, a pair of blade-shaped legs, each forming an eccentric longitudinal extension of one of said shafts, a gear wheel rigidly secured to one of said shafts, another gear wheel loosely fitted on the other shaft, an idle gear wheel meshing with both the other gear wheels, and means for rotating said loosely fitted gear wheel to first turn said rigidly secured wheel to swing the leg connected thereto about the first shaft to cover the other leg and form a closed blade-shaped fork adapted to straddle the bag end and then to turn the closed fork substantially through one semi-revolution about said other shaft, the opposite longitudinal edges of the leg that extends from said other shaft extending substantially in the same line as the axes of both said shafts.

10. In a device for closing bags by coiling the flattened end thereof, two parallel shafts, a pair of blade-shaped legs, each forming an eccentric longitudinal extension of one of said shafts, a gear wheel rigidly secured to one of said shafts, another gear wheel loosely fitted on the other shaft, an idle gear wheel meshing with both the other gear wheels, means for rotating said loosely fitted gear wheel to first turn said rigidly secured wheel to swing the leg connected thereto about the first shaft to cover the other leg and form a closed, substantially blade-shaped fork adapted to straddle the bag end and then to turn the closed fork substantially through one semi-revolution about said other shaft, and a toothed rocking segment meshing with said loosely fitted gear wheel, the opposite longitudinal edges of the leg that extends from said other shaft extending substantially in the same line as the axes of both said shafts.

11. In a device for closing bags by coiling the flattened end thereof, means for bending down the flattened bag end, a pair of blade-shaped legs, one of which being movable to form together with the other leg a closed, substantially blade-shaped fork adapted to straddle said bag end, and means for moving said closed fork laterally in a direction opposite to the direction of downfolding by turning said fork substantially through one semi-revolution about a longitudinal edge of one of said legs, substantially without lateral displacement of said edge.

12. In a device for closing bags, means adapted to coil the flattened bag end and having a pair of blade-shaped legs, one of which being movable to form together with the other leg a closed, substantially blade-shaped fork adapted to straddle said bag end, means for feeding the bag to said coiling means, means positioned above said feeding means and in advance of said coiling means for bending down the flattened bag end in a direction opposite to the feeding direction, and means for moving said closed fork laterally in the feeding direction by turning said fork substantially through one semi-revolution about a longitudinal edge of one of said legs, substantially without lateral displacement of said edge.

13. In a device for closing bags, means adapted to coil the flattened bag end and having a pair of blade-shaped legs, one of which being movable to form together with the other leg a closed, substantially blade-shaped fork adapted to straddle said bag end, a conveyor for feeding the bag to said coiling means, a stationary guide member positioned above said conveyor and in advance of said coiling means to bend down the flattened bag end in transit in a direction opposite to the feeding direction of said conveyor, and means for moving said closed fork laterally in the bag feeding direction by turning said fork substantially through one semi-revolution about a longitudinal edge of one of said legs, substantially without displacement of said edge.

14. In a device for closing bags, means for collapsing and flattening a bag end, means adapted to coil the flattened bag end and having a pair of blade-shaped legs, one of which being movable to form together with the other leg a closed, substantially blade-shaped fork adapted to straddle said bag end, means for feeding the bag from said flattening means to said coiling means, means positioned between said coiling means and said flattening means for bending down the flattened bag end in a direction opposite to the coiling direction, and means for moving said closed fork laterally in the feeding direction by turning said fork substantially through one semi-revolution about a longitudinal edge of one of said legs, substantially without displacement of said edge.

15. In a device for closing bags by coiling the flattened end thereof, means for supporting the bag, a pair of blade-shaped legs, one of which being movable to form together with the other leg a closed, substantially blade-shaped fork, means for moving said legs in their longitudinal direction into a position above said supporting means to straddle said bag end, and means for moving said closed fork laterally by turning same substantially through one semi-revolution about a longitudinal edge of one of said legs, substantially without lateral displacement of said edge.

16. In a device for closing bags by coiling the flattened end thereof, means for bending down the flattened bag end, a pair of blade-shaped legs, one of which being movable to form together with the other leg a closed, substantially blade-shaped fork, means for supporting the bag, driving means for moving said legs in their longitudinal direction into a position above said supporting means to straddle said bag end, means for holding said bag end in a downfolded position in front of the retracted legs, and means for moving said closed fork laterally by turning same substantially through one semi-revolution about a longitudinal edge of one of said legs, substantially without lateral displacement of said edge, said holding means being operatively connected to said driving means to release said bag end when said legs are moved into their position above said supporting means.

17. In a device for closing bags by coiling the flattened end thereof, means for bending down the flattened bag end, a pair of blade-shaped legs, one of which being movable to form together with the other leg a substantially blade-shaped, closed fork, means for supporting the bag, driving means for moving said legs in their longitudinal direction into a position above said supporting means to straddle said bag end, means for holding said bag end in a bent down position in front of the retracted legs, and means for moving said closed fork laterally by turning same substantially through one semi-revolution about a longitudinal edge of one of said legs, substantially without lateral displacement of said edge, said holding means comprising a pair of plates operatively connected to said driving means to be moved down against the downfolded bag end before the legs are moved into their position above said supporting means and to be elevated when said legs enter said position.

18. In a device for closing bags by coiling the flattened end thereof, a pair of blade-shaped legs, one of which being movable to form together with the other leg a closed, substantially blade-shaped fork adapted to straddle said bag end, means for coiling said bag end by moving said closed fork laterally by turning same substantially through one semi-revolution about a longitudinal edge of one of said legs, substantially without lateral displacement of said edge, means for holding down the coiled bag end, and means operatively connecting said fork with said holding means to first move said holding means into a position above the coil and fork and then to retract the fork in its longitudinal direction out of said fold.

GUSTAF ÖRSTRÖM.